United States Patent
Arimilli et al.

(10) Patent No.: US 6,185,658 B1
(45) Date of Patent: Feb. 6, 2001

(54) CACHE WITH ENHANCED VICTIM SELECTION USING THE COHERENCY STATES OF CACHE LINES

(75) Inventors: Ravi Kumar Arimilli, Austin; John Steven Dodson, Pflugerville; Jerry Don Lewis, Round Rock, all of TX (US)

(73) Assignee: International Business Machines Corporation, Armonk, NY (US)

(*) Notice: Under 35 U.S.C. 154(b), the term of this patent shall be extended for 0 days.

(21) Appl. No.: 08/992,137

(22) Filed: Dec. 17, 1997

(51) Int. Cl.[7] ........................................... G06F 12/00

(52) U.S. Cl. .................... 711/133; 711/134; 711/135; 711/136

(58) Field of Search .................... 711/133, 134, 711/136, 135

(56) References Cited

U.S. PATENT DOCUMENTS 4,463,420 * 7/1984 Fletcher ........................... 364/200

* cited by examiner

Primary Examiner—Eddie P. Chan
Assistant Examiner—Kimberly McLean
(74) Attorney, Agent, or Firm—Volel Emile; Felsman, Bradley, Vaden, Gunter & Dillon, LLP

(57) ABSTRACT

A method of evicting a cache block from a congruence class in a cache of a multi-processor computer system. After a cache miss, one of the cache blocks in the congruence class is selected for eviction based on the cache coherency states of the cache blocks. Any block having an Invalid state is preferably selected but, if such a block is not present, then one is preferably selected that has an invalid-type state, such as the new Hover state. If there are many blocks in the Hover state, then the least recently used is deallocated. If neither of these types of blocks are present, then a block is preferably selected for deallocation which is in the Modified state. This intelligent approach to victim selection generally improves cache performance.

2 Claims, 5 Drawing Sheets

CACHE WITH ENHANCED VICTIM SELECTION USING THE COHERENCY STATES OF CACHE LINES

BACKGROUND OF THE INVENTION

1. Field of the Invention

The present invention generally relates to computer systems, and more particularly to a method of selecting a cache line (victim) for deallocation from a cache used by a processor of a computer system.

2. Description of the Related Art

The basic structure of a conventional multi-processor computer system 10 is shown in FIG. 1. Computer system 10 has several processing units, two of which 12a and 12b are depicted, which are connected to various peripheral devices, including input/output (I/O) devices 14 (such as a display monitor, keyboard, and permanent storage device), memory device 16 (such as random access memory or RAM) that is used by the processing units to carry out program instructions, and firmware 18 whose primary purpose is to seek out and load an operating system from one of the peripherals (usually the permanent memory device) whenever the computer is first turned on. Processing units 12a and 12b communicate with the peripheral devices by various means, including a generalized interconnect or bus 20. Computer system 10 may have many additional components which are not shown, such as serial and parallel ports for connection to, e.g., modems or printers. Those skilled in the art will further appreciate that there are other components that might be used in conjunction with those shown in the block diagram of FIG. 1; for example, a display adapter might be used to control a video display monitor, a memory controller can be used to access memory 16, etc. The computer can also have more than two processing units.

In a symmetric multi-processor (SMP) computer, all of the processing units are generally identical, that is, they all use a common set or subset of instructions and protocols to operate, and generally have the same architecture. A typical architecture is shown in FIG. 1. A processing unit includes a processor core 22 having a plurality of registers and execution units, which carry out program instructions in order to operate the computer. An exemplary processing unit includes the PowerPC™ processor marketed by International Business Machines Corp. The processing unit can also have one or more caches, such as an instruction cache 24 and a data cache 26, which are implemented using high speed memory devices. Caches are commonly used to temporarily store values that might be repeatedly accessed by a processor, in order to speed up processing by avoiding the longer step of loading the values from memory 16. These caches are referred to as "on-board" when they are integrally packaged with the processor core on a single integrated chip 28. Each cache is associated with a cache controller (not shown) that manages the transfer of data between the processor core and the cache memory.

A processing unit can include additional caches, such as cache 30, which is referred to as a level 2 (L2) cache since it supports the on-board (level 1) caches 24 and 26. In other words, cache 30 acts as an intermediary between memory 16 and the on-board caches, and can store a much larger amount of information (instructions and data) than the on-board caches can, but at a longer access penalty. For example, cache 30 may be a chip having a storage capacity of 256 or 512 kilobytes, while the processor may be an IBM PowerPC™ 604-series processor having on-board caches with 64 kilobytes of total storage. Cache 30 is connected to bus 20, and all loading of information from memory 16 into processor core 22 must come through cache 30. Although FIG. 1 depicts only a two-level cache hierarchy, multi-level cache hierarchies can be provided where there are many levels (L3, L4, etc.) of serially connected caches.

In an SMP computer, it is important to provide a coherent memory system, that is, to cause write operations to each individual memory location to be serialized in some order for all processors. For example, assume a location in memory is modified by a sequence of write operations to take on the values: 1, 2, 3, 4. In a cache coherent system, all processors will observe the writes to a given location to take place in the order shown. However, it is possible for a processing element to miss a write to the memory location. A given processing element reading the memory location could see the sequence 1, 3, 4, missing the update to the value 2. A system that implements these properties is said to be "coherent". Virtually all coherency protocols operate only to the granularity of the size of a cache block. That is to say, the coherency protocol controls the movement of and write permissions for data on a cache block basis and not separately for each individual memory location.

There are a number of protocols and techniques for achieving cache coherence that are known to those skilled in the art. At the heart of all these mechanisms for maintaining coherency is the requirement that the protocols allow only one processor to have a "permission" that allows a write to a given memory location (cache block) at any given point in time. As a consequence of this requirement, whenever a processing element attempts to write to a memory location, it must first inform all other processing elements of its desire to write the location and receive permission from all other processing elements to carry out the write. The key issue is that all other processors in the system must be informed of the write by the initiating processor before the write occurs. Furthermore, if a block is present in the L1 cache of a given processing unit, it is also present in the L2 and L3 caches of that processing unit. This property is known as inclusion and is well known to those skilled in the art. Henceforth, it is assumed that the principle of inclusion applies to the caches related to the present invention.

To implement cache coherency in a system, the processors communicate over a common generalized interconnect (i.e., bus 20). The processors pass messages over the interconnect indicating their desire to read or write memory locations. When an operation is placed on the interconnect, all of the other processors "snoop" (monitor) this operation and decide if the state of their caches can allow the requested operation to proceed and if so, under what conditions. There are several bus transactions that require snooping and follow-up action to honor the bus transactions and maintain memory coherency. The snooping operation is triggered by the receipt of a qualified snoop request, generated by the assertion of certain bus signals. Instruction processing is interrupted only when a snoop hit occurs and the snoop state machine determines that an additional cache snoop is required to resolve the coherency of the offended sector.

This communication is necessary because, in systems with caches, the most recent valid copy of a given block of memory may have moved from the system memory 16 to one or more of the caches in the system (as mentioned above). If a processor (say 12a) attempts to access a memory location not present within its cache hierarchy, the correct version of the block, which contains the actual (current) value for the memory location, may either be in the system memory 16 or in one of more of the caches in another processing unit, e.g. processing unit 12b. If the correct version is in one or more of the other caches in the system, it is necessary to obtain the correct value from the cache(s) in the system instead of system memory.

For example, consider a processor, say 12a, attempting to read a location in memory. It first polls its own L1 cache (24 or 26). If the block is not present in the L1 cache, the request is forwarded to the L2 cache (30). If the block is not present in the L2 cache, the request is forwarded on to lower cache levels, e.g., the L3 cache. If the block is not present in the lower level caches, the request is then presented on the generalized interconnect (20) to be serviced. Once an operation has been placed on the generalized interconnect, all other processing units snoop the operation and determine if the block is present in their caches. If a given processing unit has the block of data requested by processing unit in its L1 cache, and that data is modified, by the principle of inclusion the L2 cache and any lower level caches also have copies of the block (however, their copies are stale, since the copy in the processor's cache is modified). Therefore, when the lowest level cache (e.g., L3) of the processing unit snoops the read operation, it will determine that the block requested is present and modified in a higher level cache. When this occurs, the L3 cache places a message on the generalized interconnect informing the processing unit that it must "retry" it's operation again at a later time, because the actual value of the memory location is in the L1 cache at the top of the memory hierarchy and must be retrieved to make it available to service the read request of the initiating processing unit.

Once the request from an initiating processing unit has been retried, the L3 cache begins a process to retrieve the modified data from the L1 cache and make it available at the L3 cache, main memory or both, depending on the exact details of the implementation which are not specifically relevant to this invention. To retrieve the block from the higher level caches, the L3 cache sends messages through the inter-cache connections to the higher level caches, requesting that the block be retrieved. These messages propagate up the processing unit hierarchy until they reach the L1 cache and cause the block to be moved down the hierarchy to the lowest level (main memory) to be able to service the request from the initiating processing unit.

The initiating processing unit eventually re-presents the read request on the generalized interconnect. At this point, however, the modified data has been retrieved from the L1 cache of a processing unit and the read request from the initiating processor will be satisfied. The scenario just described is commonly referred to as a "snoop push". A read request is snooped on the generalized interconnect which causes the processing unit to "push" the block to the bottom of the hierarchy to satisfy the read request made by the initiating processing unit.

The essential point is that, when a processor wishes to read or write a block, it must communicate that desire with the other processing units in the system in order to maintain cache coherence. To achieve this, the cache coherence protocol associates with each block in each level of the cache hierarchy, a status indicator indicating the current "state" of the block. The state information is used to allow certain optimizations in the coherency protocol that reduce message traffic on the generalized interconnect and the inter-cache connections. As one example of this mechanism, when a processing unit executes a read it receives a message indicating whether or not the read must be retired later. If the read operation is not retried, the message usually also includes information allowing the processing unit to determine if any other processing unit also has a still active copy of the block (this is accomplished by having the other lowest level caches give a "shared" or "not shared" indication for any read they do not retry). Therefore, a processing unit can determine whether any other processor in the system has a copy of the block. If no other processing unit has an active copy of the block, the reading processing unit marks the state of the block as "exclusive". If a block is marked exclusive it is permissible to allow the processing unit to later write the block without first communicating with other processing units in the system because no other processing unit has a copy of the block. Therefore, it is possible for a processor to read or write a location without first communicating this intention onto the interconnection, but only where the coherency protocol has insured that no other processor has an interest in the block.

The foregoing cache coherency technique is implemented in a specific protocol referred to as "MESI," and illustrated in FIG. 2. In this protocol, a cache block can be in one of four states, "M" (Modified), "E" (Exclusive), "S" (Shared) or "I" (Invalid). Under the MESI protocol, each cache entry (e.g., a 32-byte block) has two additional bits which indicate the state of the entry, out of the four possible states. Depending upon the initial state of the entry and the type of access sought by the requesting processor, the state may be changed, and a particular state is set for the entry in the requesting processor's cache. For example, when a block is in the Modified state, the addressed block is valid only in the cache having the modified block, and the modified data has not been written back to system memory. When a block is Exclusive, it is present only in the noted block, and is consistent with system memory. If a block is Shared, it is valid in that cache and in at least one other cache, all of the shared blocks being consistent with system memory. Finally, when a block is Invalid, it indicates that a valid copy of the addressed block is not resident in the cache. As seen in FIG. 2, if a block is in any of the Modified, Shared or Invalid states, it can move between the states depending upon the particular bus transaction. While a block in an Exclusive state can move to any other state, a block can only become Exclusive if it is first Invalid.

The blocks in any set-associative cache are divided into groups of blocks called "sets". A set is the collection of blocks that a given memory block can reside in. For any given memory block, there is a unique set in the cache (a congruence class) that the block can be mapped into, according to preset mapping functions. However, several different blocks in main memory can be mapped to any given set. The number of blocks in a set is referred to as the associativity of the cache (e.g. 2-way set associative means that for any given memory block, there are two blocks in the cache that the memory block can be mapped into). When all of the blocks in a set for a given cache are full and that cache receives a request, whether a "read" or "write," to a memory location that maps into the full set, the cache must evict one of the blocks currently in the set. The cache chooses a block by one of a number of means known to those skilled in the art (least recently used (LRU), random, pseudo-LRU, etc.) to be evicted. If the data in the chosen block is modified, that data is written to the next lowest level in the memory hierarchy which may be another cache (in the case of the L1 or on-board cache) or main memory (in the case of an L2 cache, as depicted in the two-level architecture of FIG. 1). By the principle of inclusion, the lower level of the hierarchy will already have a block available to hold the written modified data. However, if the data in the chosen block is not modified, the block is simply abandoned and not written to the next lowest level in the hierarchy. This process of removing a block from one level of the hierarchy is known as an eviction. At the end of this process, the cache no longer holds a copy of the evicted block.

A typical LRU eviction mechanism is shown in FIG. 3. A cache (L1 or a lower level) includes a cache directory 32, an LRU array 34, and control logic 36 for selecting a block for eviction from a particular congruence class. The depicted cache is 8-way set associative, and directory 32 has a specific set of eight blocks for a particular congruence class (the cache entry array, not shown, also has eight blocks per class). Each congruence class in the directory has a corresponding collection of LRU information associated with it in LRU array 34.

If a cache miss occurs, and if all of the blocks in the particular congruence class have been previously filled in response to earlier read and write operations, then one of the cache blocks in congruence class must be selected for victimization. This selection is performed using the LRU bits for the congruence class in LRU array 34. For each congruence class, there are a plurality of LRU bits, for example, three LRU bits per block for an 8-way set associative cache. The LRU bits from each block in the class are provided as inputs to control logic 36 which has an 8-bit output to indicate which of the blocks is to be victimized, according to known algorithms which examine the LRU bits from each block. This output can be coupled to a multiplexer which passes on an indication of the cache block to be used for eviction.

One problem with prior art SMP systems relates to the eviction of a block having a data value which is in a coherency state that suggests it should not be evicted. For example, in the prior art MESI protocol, a particular congruence class might have several members which are in the Modified state, and several members which are in the Invalid state, and the least recently used block may be any of these blocks. In the case where a Modified block is the least recently used, that block will be evicted rather than one of the Invalid state blocks. This outcome is undesirable since it is likely that the Modified block would be accessed again by the processor core in the near future. Similarly, it might be preferable in some instances to evict a Modified block rather than evicting a Shared block, but conventional deallocation mechanisms are incapable of performing such intelligent victim selection. This inefficiency imposes a performance degradation and is a limitation of the prior art systems. It would, therefore, be desirable to devise an improved victim selection mechanism which made use of coherency state information. It would be further advantageous if the method were easily applied to new coherency states as well.

SUMMARY OF THE INVENTION

It is therefore one object of the present invention to provide an improved cache to be used by a processor of a computer system.

It is another object of the present invention to provide an enhanced victim selection mechanism for such a cache.

It is yet another object of the present invention to provide such an enhanced victim selection mechanism which makes use of coherency states that are assigned to each member of a congruence class.

The foregoing objects are achieved in a method of evicting a cache block generally comprising the steps of defining a congruence class of the cache consisting of a plurality of cache blocks, assigning at least two cache coherency states to the cache blocks, comparing a requested address with a plurality of addresses respectively associated with the plurality of cache blocks to determine when a requested address is not present in the cache, and selecting one of the cache blocks in the congruence class for eviction based on the cache coherency states of the cache blocks. The plurality of cache blocks can include at least two cache blocks having a priority coherency state (such as a Invalid state), wherein the selecting step selects a cache block for eviction which is first detected as having the priority coherency state. Alternatively (or additionally), a different priority coherency state can be used (such as an Modified state) wherein the selecting step includes the step of determining which among the cache blocks having the priority coherency state is the least recently used. In particular, the present invention can be applied to a more complicated HRT-MESI cache coherency protocol which includes a Hover state, a Recent state, and a Tagged state, in addition to the four prior art states. The present invention preferably picks Invalid blocks (or blocks with invalid-type states such as Hover) for eviction first and, if such blocks are not present, then picks Modified blocks for eviction over blocks with other coherency states. This intelligent approach to victim selection generally improves cache performance.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF THE PREFERRED EMBODIMENT

Figure 1:
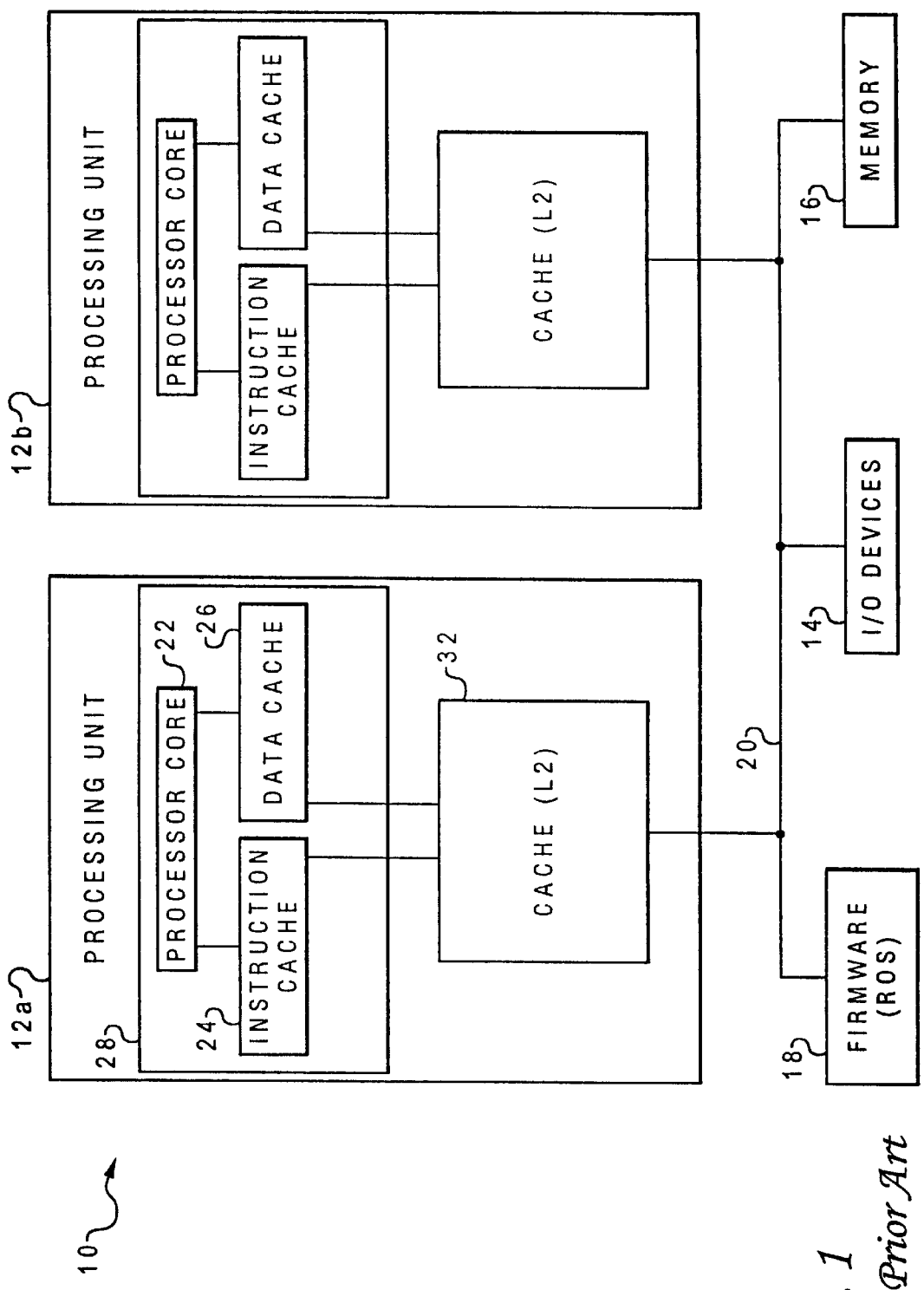
FIG. 1 is a block diagram of a prior art multiprocessor computer system.

The present invention is directed to a method of evicting caches used in a multi-processor system, such as the system of FIG. 1, but the present invention could be applied to computer systems that are not necessarily conventional, i.e., they could include new hardware components not shown in FIG. 1, or have a novel interconnection architecture for existing components. Therefore, those skilled in the art will appreciate that the present invention is not limited to the generalized system shown in that figure.

Figure 2:
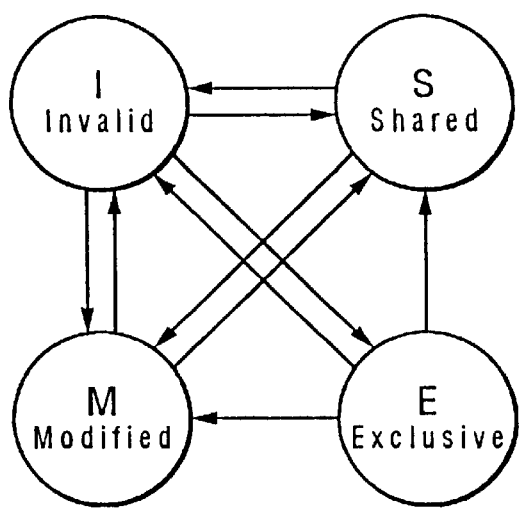
FIG. 2 is a state diagram depicting a prior art cache coherency protocol (MESI)
Figure 3:
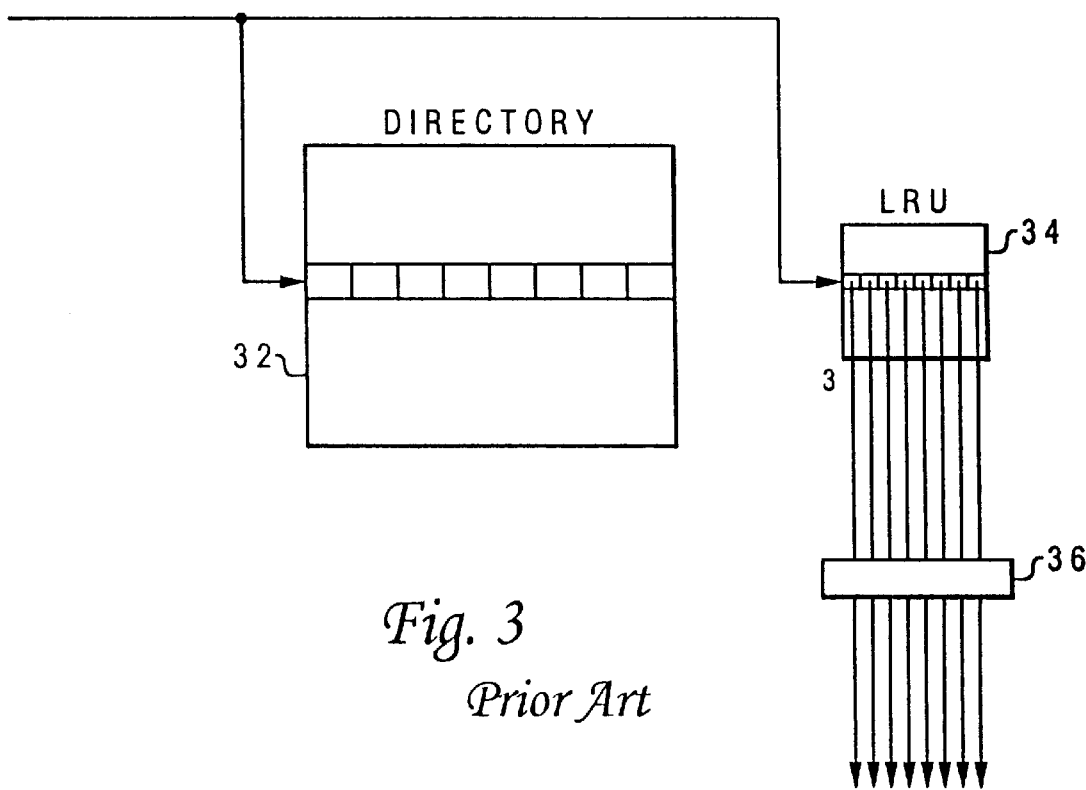
FIG. 3 is a high level schematic diagram of a portion of a conventional cache having a least recently used (LRU) eviction mechanism.
Figure 4:
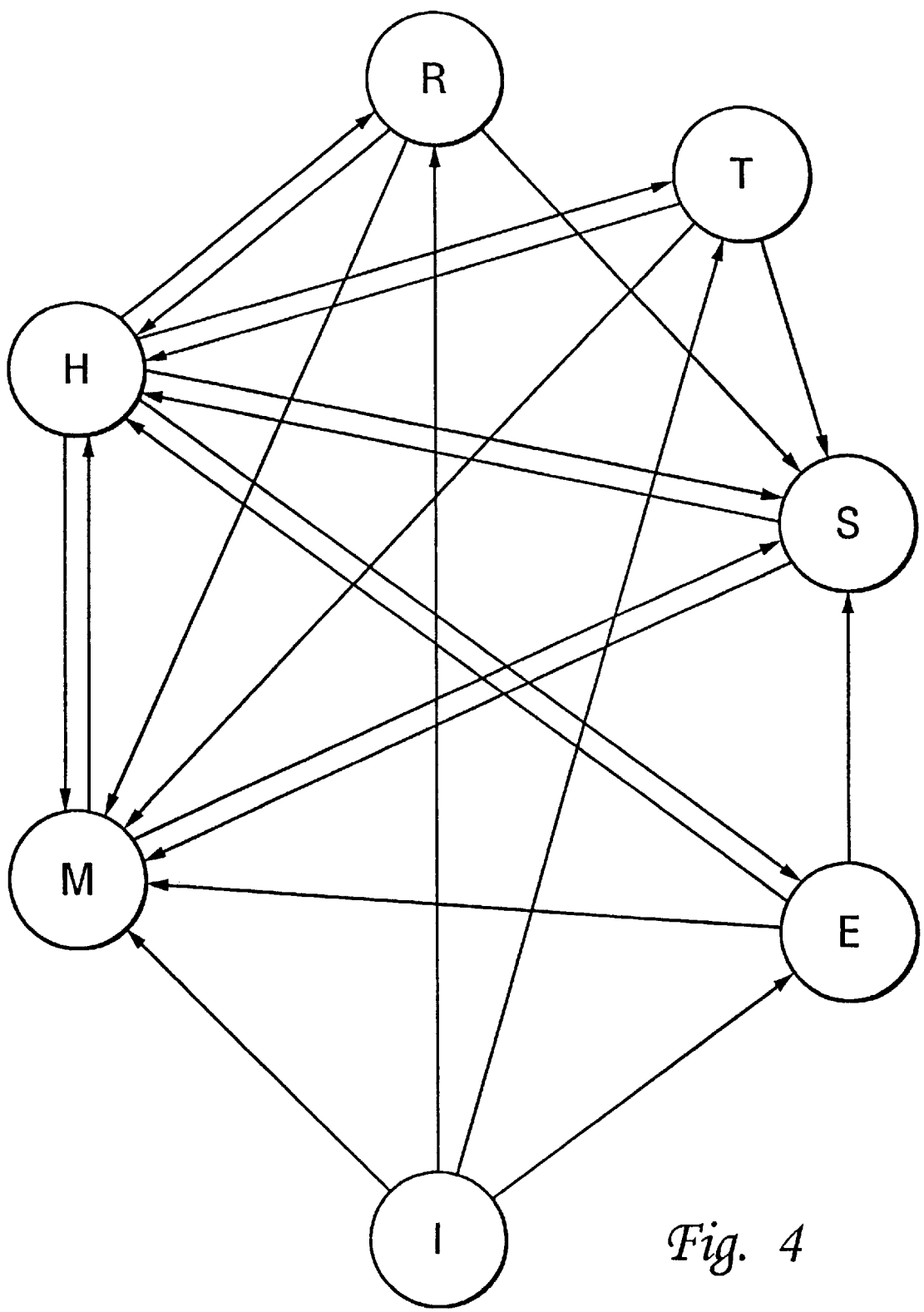
FIG. 4 is a state diagram depicting a cache coherency protocol (HRT-MESI) which may be used in conjunction with the present invention.

The present invention provides an enhanced victim selection method which uses information relating to the coherency states of the members of the congruence class. While the invention may be applied to prior art cache coherency protocols such as the MESI protocol depicted in FIG. 2, it may be further advantageous in more complicated coherency protocols such as the "HRT-MESI" protocol depicted in FIG. 4. The HRT-MESI protocol combines the four prior art MESI states with three new coherency states, H (Hover), R (Recent), and T (Tagged). These states are described more fully in the following referenced U.S. patent applications, each of which is hereby incorporated, and which are only briefly described herein.

The Hover state is used by a cache to indicate that a previously valid value has been modified elsewhere (i.e., by a processor other than the one associated with this cache), but has not yet been updated in this particular cache. This state allows the cache to monitor snoop operations to see if the new, modified value is being presented along the system bus. The new value might be presented to the bus by a push of the value to system memory (RAM), or due to intervention by another cache (intervention is the method of one cache providing a value to another cache directly, without involving the system memory). If a cache block is held in the H state, then when the new value is presented to the system bus (for purposes unrelated to this cache block), the value can be opportunely read into the cache block. Thereafter, the cache block would hold the value in a Shared state. Several such cache blocks in the H state (and in different caches) can read the same value when it is presented. The Hover state is described more fully in U.S. patent application Ser. No. 09/024,610. As noted there, the Hover state is somewhat similar to the Invalid state as regards its coherency responses.

The Recent state is used by a cache to indicate that a cache line holding a valid value is the most recently accessed (read) cache among several caches that share the value. The other caches hold the value in a Shared state. The Recent state provides a practical approach to allowing intervention of shared values. After a cache holding a value in the R state sources data, it switches to the S state, and the cache block for the processing unit which just read the value then becomes the new R state block. The R state thus migrates among blocks in different caches. The Recent state is described more fully in U.S. patent application Ser. No. 08/839,548. As noted there, the Recent state is somewhat similar to the Shared state as regards its coherency responses, and implies that the value is consistent with system memory, i.e., that any modified value has already been written to system memory or that some other part of the memory hierarchy is responsible for writing any modified value to system memory.

The Tagged state is used by a cache to indicate that a value has been modified but not yet written to system memory, i.e., that the cache line holding the modified value in the T state is (for the moment, at least) responsible for ensuring that the modified value is written to system memory. A cache block in the T state is used to intervene data without requiring the involvement of system memory, that is, without system memory reading the modified value during intervention. When a cache block in the T state sources a value, it then switches to the S state (or to one of many optional states which provide historical cache state information). The cache which receives the value holds it as the new T state cache block. The Tagged state is described more fully in U.S. patent application Ser. No. 09/024,393. As noted there, the Tagged state is somewhat similar to the Modified state as regards its coherency responses.

These three new coherency states may be combined in several different ways. An RT-MESI protocol is described in U.S. patent application Ser. No. 09/024,619. An HT-MESI protocol and the HRT-MESI protocol are described in U.S. patent application Ser. No. 09/024,609.

Figure 5:
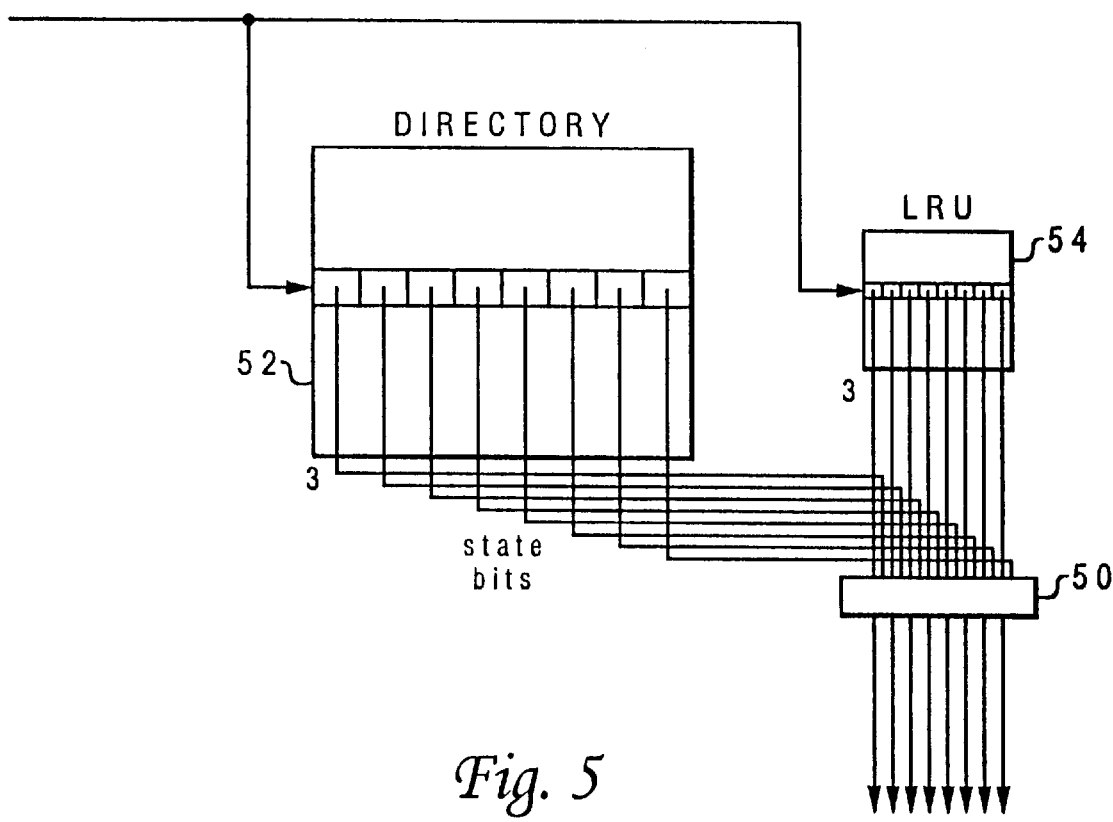
FIG. 5 is a high level schematic diagram of a portion of one embodiment of a cache constructed in accordance with the present invention, wherein state bits associated with each cache entry are provided, along with LRU bits, to the control logic for selecting an eviction victim.

With further reference to FIG. 5, the coherency states of each member of a congruence class may be taken into consideration when selecting an eviction victim for that class, by providing the coherency state bits to a decoder 50 which also receives information (LRU bits) regarding which of the members have been least recently used. The state bits are provided by cache directory 52, and the LRU bits are provided by an LRU array 54. Control logic within decoder 50 evaluates both the cache state information and LRU information as discussed below to select an optimum victim for deallocation. While the state bits are schematically portrayed in FIG. 5 as being part of the address, i.e., located in the cache directory, those skilled in the art will appreciate that the state bits may be stored in a separate array or even with the values in the cache entry array.

The method of victim selection according to the present invention preferably selects a cache block which is Invalid for eviction, if one is available in the congruence class.

If there are several Invalid cache blocks in the class, then the first one detected can be used for eviction (rather than applying an LRU scheme—using the first one detected in the priority scheme speeds up the effective performance of decoder 50 slightly by skipping the LRU algorithm). If there are no Invalid cache blocks in the class, then the preferred approach is to select a cache block having a state which is similar to the Invalid state, in the sense that any value held in the cache entry array must be assumed to be incorrect. For the HRT-MESI implementation, this approach means that H state cache blocks should be considered for eviction if any are present rather than selecting a block in a "valid" state (R, T, M, E, or S). If there are many H state blocks available, then the least recently used among them is preferably selected.

Figure 6:
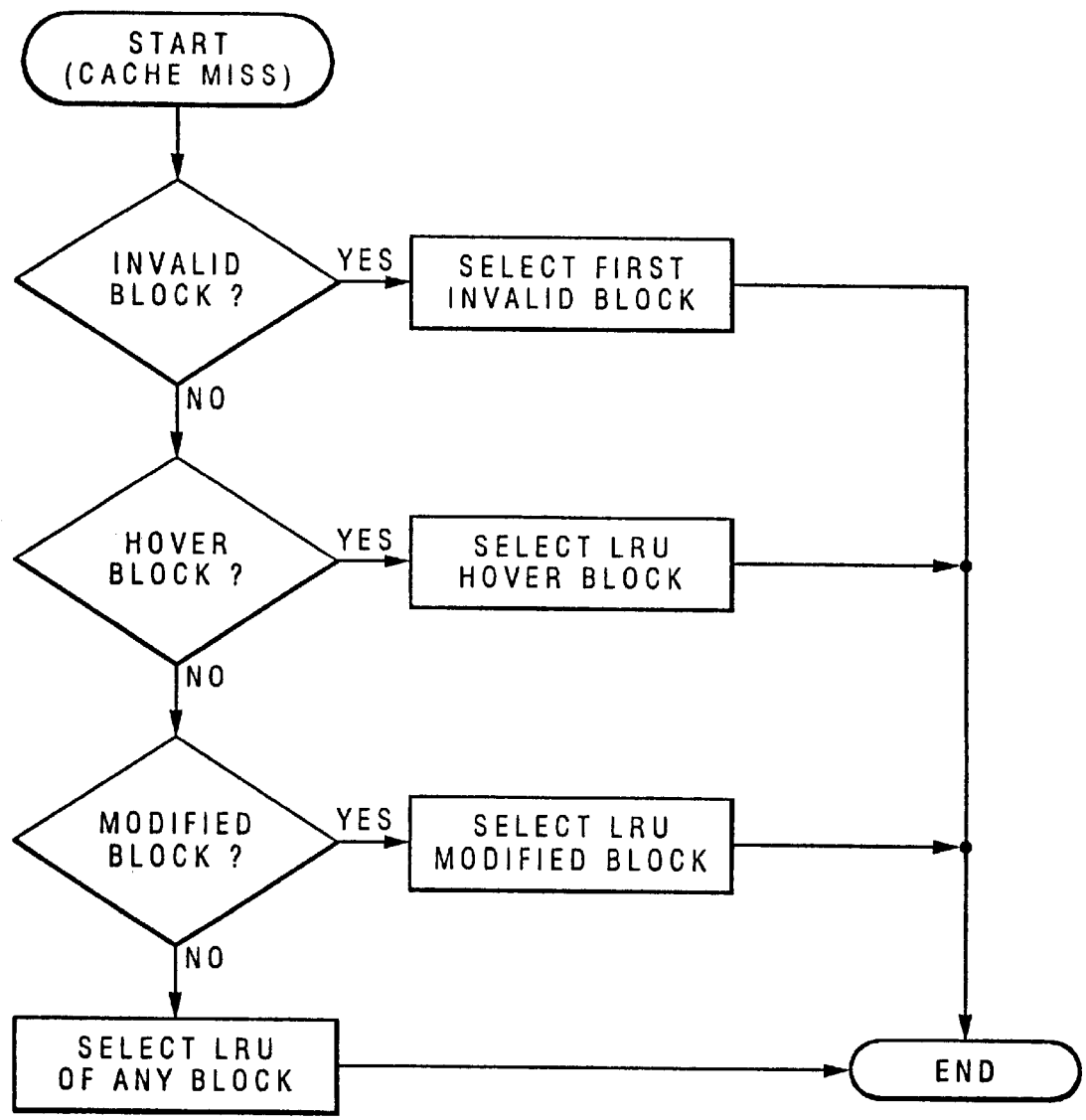
FIG. 6 is a chart depicting the logic flow used in one embodiment of the enhanced victim selection mechanism of the present invention, associated with the cache coherency protocol depicted in FIG. 4.

The present invention can be refined according to the complexity of the particular cache coherency protocol to which it is applied. For example, further evaluations may be performed in the HRT-MESI implementation, if there are no I or H state cache blocks available in the subject congruence class. Such a branch of the control logic preferably selects a Modified cache block for eviction over selection of a Shared, Tagged, Recent or Exclusive block. A Modified cache block is selected for eviction because there is a significant chance that cache blocks in other caches are hovering in the H state, waiting for the value to be presented to the system bus, and so deallocation of an M state block pushes the value to the bus and allows the H state blocks to pick up the value and switch to S. If there are many M state blocks available, then the least recently used among them is preferably selected. This prioritizing of states for eviction is depicted in the flow chart of FIG. 6.

While the specific HRT-MESI implementation can be refined even further, this would appear to provide marginally decreasing returns. Theoretically, some benefit might come of deallocating T state blocks rather than R, S or E blocks, for the same reason given above for deallocating an M block (sourcing to H blocks). Some theoretically benefit would further arise by picking an S state block over an R state block.

If use of a victim selection mechanism based on coherency states should inadvertently inhibit performance due to an unusual programming anomaly, means may be provided to disable the coherency state evaluation, i.e., to revert to a basic LRU scheme without regard to coherency states. This case can be selected using a mode bit, similar to the "WIM" mode bits used in the prior art. In this case, decoder 50 simply ignores the state bits from directory 52 and makes the victim determination based solely on the LRU bits from array 54.

While provision of control logic which evaluates the state bits complicates the circuit construction (and requires extra silicon area), the benefit derived from increased performance of the cache by using the present invention generally overcomes such concerns, especially as the cost of providing extra circuitry diminishes with respect to the demand for increased processor performance.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method of evicting a cache block in a cache used by a computer processor, the method comprising the steps of:

defining a congruence class of the cache consisting of a plurality of cache blocks;

assigning at least four cache coherency states to the cache blocks, wherein the coherency states include an invalid state, a hover state, a modified state, and a shared state;

comparing a requested address with a plurality of addresses respectively associated with the plurality of cache blocks to determine when a requested address is not present in the cache; and selecting one of the cache blocks in the congruence class for eviction, in response to said comparing step, based on the cache coherency states of the cache blocks, wherein said selecting step selects a cache block having an invalid state if present in the congruence class and, if not, selects a cache block having a hover state if present in the congruence class and, if not, selects a cache block having a modified state if present in the congruence class.

2. A computer system comprising:

a memory device;

a bus connected to said memory device;

a plurality of processing units connected to said bus, each processing unit having a cache, and each cache having a plurality of cache blocks for storing data values associated with said memory device; and cache coherency means for assigning at least four cache coherency states to said cache blocks, including an invalid state, a hover state, a modified state, and a shared state, wherein each cache further has a victim selection mechanism including means for selecting one of said cache blocks in a given cache for eviction based on the cache coherency states of cache blocks in said given cache, said selecting means selecting a cache block having an invalid state if present in said given cache and, if not, selecting a cache block having a hover state if present in said given cache and, if not, selecting a cache block having a modified state if present in said given cache.

* * * * *